US011708109B2

(12) United States Patent
Hirao et al.

(10) Patent No.: US 11,708,109 B2
(45) Date of Patent: Jul. 25, 2023

(54) VEHICLE CONTROL SYSTEM

(71) Applicant: HITACHI AUTOMOTIVE SYSTEMS, LTD., Hitachinaka (JP)

(72) Inventors: Ryusuke Hirao, Kamagaya (JP); Nobuyuki Ichimaru, Yokohama (JP); Kentaro Kasuya, Utsunomiya (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 173 days.

(21) Appl. No.: 16/647,978

(22) PCT Filed: Sep. 14, 2018

(86) PCT No.: PCT/JP2018/034093
§ 371 (c)(1),
(2) Date: Mar. 17, 2020

(87) PCT Pub. No.: WO2019/065289
PCT Pub. Date: Apr. 4, 2019

(65) Prior Publication Data
US 2020/0262477 A1    Aug. 20, 2020

(30) Foreign Application Priority Data
Sep. 27, 2017    (JP) ................................ 2017-186960

(51) Int. Cl.
*B62D 15/02*        (2006.01)
*B60W 30/08*        (2012.01)
(Continued)

(52) U.S. Cl.
CPC ........... *B62D 15/025* (2013.01); *B60W 30/08* (2013.01); *B62D 5/0463* (2013.01); *G05D 1/0891* (2013.01); *G05D 2201/0213* (2013.01)

(58) Field of Classification Search
CPC combination set(s) only.
See application file for complete search history.

(56) References Cited

U.S. PATENT DOCUMENTS

| 4,673,194 A | * | 6/1987 | Sugasawa | ............ B60G 17/016 701/37 |
| 2005/0280219 A1 | * | 12/2005 | Brown | ..................... B60G 3/20 280/5.5 |

(Continued)

FOREIGN PATENT DOCUMENTS

| DE | 102004044323 | 3/2006 |
| DE | 102006046819 | 4/2008 |

(Continued)

OTHER PUBLICATIONS

International Search Report dated Dec. 11, 2018 in International (PCT) Patent Application No. PCT/JP2018/034093, with English Translation.

(Continued)

*Primary Examiner* — Jeff A Burke
*Assistant Examiner* — Zachary Joseph Wallace
(74) *Attorney, Agent, or Firm* — Wenderoth, Lind & Ponack, L.L.P.

(57) ABSTRACT

A shock damper is disposed between a vehicle body side and a wheel side. A suspension control device calculates a damping force of the shock damper on the basis of vehicle height information and controls the damping force. A steering system includes an electric motor and a steering control device that controls the electric motor, and assists steering effort of the driver through the electric motor. The suspension control device calculates the vibration generated in a steering on the basis of a detected value of a vehicle height sensor and creates a signal for generating steering torque that reduces the generated vibration. The suspension control device outputs the created signal to the steering control device. Steering torque for cancelling steering vibration is accordingly outputted from the electric motor of the steering system.

7 Claims, 3 Drawing Sheets

(51) Int. Cl.
*B62D 5/04* (2006.01)
*G05D 1/08* (2006.01)

(56) References Cited

U.S. PATENT DOCUMENTS

| | | | |
|---|---|---|---|
| 2007/0129865 A1* | 6/2007 | Kim | B60G 17/0185 |
| | | | 701/37 |
| 2008/0133066 A1 | 6/2008 | Takenaka | |
| 2009/0000857 A1* | 1/2009 | Sugiyama | B62D 5/0472 |
| | | | 180/444 |
| 2009/0001679 A1 | 1/2009 | Kajino et al. | |
| 2015/0088379 A1* | 3/2015 | Hirao | B60G 17/08 |
| | | | 701/37 |
| 2015/0224845 A1* | 8/2015 | Anderson | B60G 17/019 |
| | | | 701/37 |
| 2016/0129933 A1* | 5/2016 | Akatsuka | B62D 15/025 |
| | | | 180/446 |
| 2017/0267276 A1 | 9/2017 | Kodera et al. | |
| 2018/0319241 A1* | 11/2018 | Hirao | B60G 17/08 |
| 2018/0361816 A1* | 12/2018 | Ohno | B60G 17/06 |
| 2019/0002022 A1* | 1/2019 | Kim | B62D 6/02 |
| 2019/0084616 A1 | 3/2019 | Bronikowski et al. | |

FOREIGN PATENT DOCUMENTS

| | | |
|---|---|---|
| DE | 102008029914 | 2/2009 |
| DE | 102018122903 | 3/2019 |
| JP | 2007-331517 | 12/2007 |
| JP | 2017-165219 | 9/2017 |
| WO | 2006/013922 | 2/2006 |

OTHER PUBLICATIONS

Written Opinion of the International Searching Authority dated Dec. 11, 2018 in International (PCT) Patent Application No. PCT/JP2018/034093, with English Translation.
Office Action dated Mar. 4, 2022 in corresponding DE Application No. 112018005542.6, with Machine Translation, 11 pages.

* cited by examiner

VEHICLE CONTROL SYSTEM

TECHNICAL FIELD

The invention relates to vehicle control systems installed in vehicles, such as automobiles.

BACKGROUND ART

A vehicle, such as an automobile, is provided with a shock damper (damper) between a vehicle body (sprung) side and a wheel (unsprung) side. The vehicle body is provided with a steering system that applies a steering angle to a wheel (steered wheel) according to a steering operation by a driver. Patent Literature 1 discusses a system for controlling steering characteristics, which changes steering characteristics according to unevenness of the road surface on which a vehicle travels (roughness degree of the road surface). This system for controlling steering characteristics calculates the roughness degree of the road surface from vehicle height information. If determining that the road surface is rough, the system reduces steering sensitivity within an area where steering amount is small, and thus properly controls the steering characteristics.

CITATION LIST

Patent Literature

PTL 1: Japanese Unexamined Patent Application Publication (Kokai) No. 2007-331517

SUMMARY OF INVENTION

Technical Problem

According to a power steering system designed to assist (aid) the driver's steering effort through an electric motor or a hydraulic pump, unwanted vibration (steering vibration) might be transmitted from a road surface to a steering wheel (handle). A possible idea to reduce such steering vibration is, for example, to calculate steering velocity by differentiating a steering angle detected by a steering angle sensor and then generate torque from the electric motor to reduce the steering velocity, to thereby reduce steering angle vibration. On the other hand, if the steering vibration is adequately reduced through the foregoing constitution, a resistive force against steering velocity is increased, which increases the steering effort. Accordingly, the reduction of the steering vibration and the steering assist may not be achieved at the same time.

An object of the invention is to provide a vehicle control system that is capable of reducing steering vibration and providing proper assistance when steering is performed.

Solution to Problem

A vehicle control system according to one embodiment of the invention comprises a force generating mechanism disposed between a vehicle body side and a wheel side in a vehicle and capable of adjusting a generated force, and a force generating mechanism control portion configured to calculate the generated force of the force generating mechanism on the basis of vehicle body behavior information and control the generated force. The force generating mechanism control portion includes a vehicle height information detecting portion configured to detect vehicle height information of the vehicle and a steering torque generating portion configured to calculate vibration generated in a steering on the basis of a detected value of the vehicle height information detecting portion and generate steering torque for reducing the generated vibration.

The vehicle control system according to the one embodiment of the invention is capable of reducing steering vibration and providing proper assistance when steering is performed.

BRIEF DESCRIPTION OF DRAWINGS

FIG. 2 is a block diagram showing a suspension control device of FIG. 1 together with a steering control device and the like.

DESCRIPTION OF EMBODIMENTS

A vehicle control system according to an embodiment will be described with reference to the attached drawings, taking as an example a case in which the vehicle control system is installed in a four-wheeled vehicle.

Figure 1:
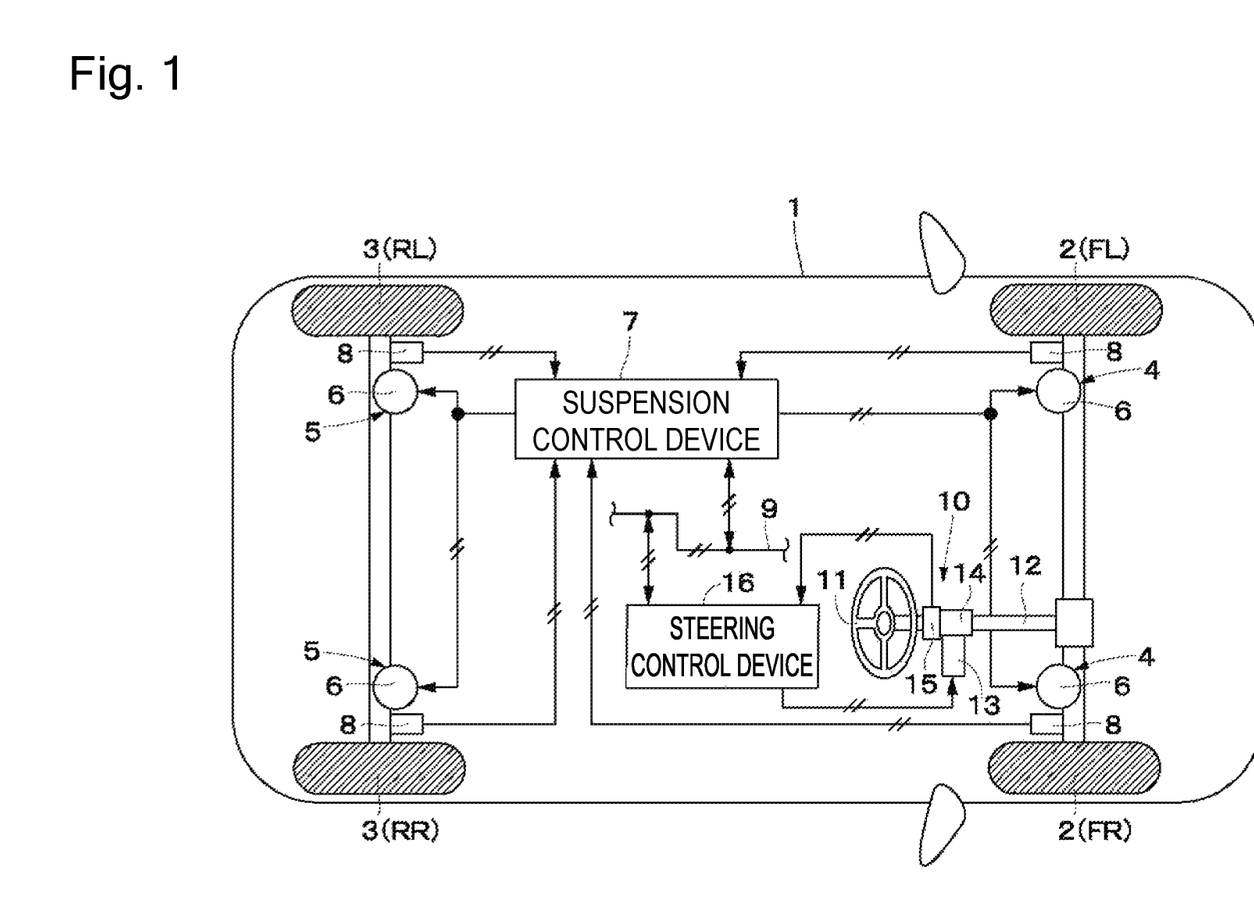
FIG. 1 is a conceptual diagram of a vehicle in which a vehicle control system according to an embodiment is installed.

In FIG. 1, a vehicle body 1 forms a body of the vehicle. Disposed under the vehicle body 1 are wheels that form the vehicle as with the vehicle body 1. The wheels comprise, for example, four wheels 2 and 3 including right and left front wheels 2 (FL, FR) and right and left rear wheels (RL, RR). Referring to FIG. 1, a front side of the vehicle is shown on the right side of the figure, a rear side of the vehicle on the left side of the figure, a left side of the vehicle on the upper side of the figure, and a right side of the vehicle on the lower side of the figure.

Suspension devices 4 and 5 are interposed between the vehicle body 1 on one side and the wheels 2 and 3 on the other. The suspension device 4 for the left front wheel is disposed between the left front wheel 2 (FL) side and the vehicle body 1. The suspension device 4 for the right front wheel is disposed between the right front wheel 2 (FR) side and the vehicle body 1. The suspension device 5 for the left rear wheel is disposed between the left rear wheel 3 (RL) side and the vehicle body 1. The suspension device 5 for the right rear wheel is disposed between the right rear wheel 3 (RR) side and the vehicle body 1.

The suspension devices 4 and 5 each comprise a suspension spring (spring), such as a coil spring, not shown, and a shock damper 6 disposed between the vehicle body 1 and each of the wheels 2 and 3 in parallel with the corresponding suspension spring. The shock damper 6 is referred to also as a shock absorber. The shock damper 6 is configured as a hydraulic damping-force adjusting shock damper that is capable of adjusting a generated damping force. In this case, the shock damper 6 is provided with an actuator, not shown, comprising a damping force adjustment valve, a solenoid, and the like, in order to adjust the characteristics of the generated damping force (damping force characteristics) from hard characteristics (thick characteristics) to soft characteristics (thin characteristics) in a continuous manner. The shock damper 6 comprises a semi-active damper configured to control a hydraulic fluid flow using the actuator. In short, the shock damper 6 is a force generating mechanism that is capable of adjusting a force generated between the vehicle body 1 on one side and the wheels 2 and 3 on the other in the vehicle.

The actuator for adjusting a damping force, which is provided to the shock damper 6, may be configured to adjust the damping force characteristics intermittently in multiple steps, or more specifically, two or more steps (in a stepped manner), instead of changing the damping force characteristics in the continuous manner. The shock damper 6 may be an ER damper (electrorheological fluid damper), a pneumatic damper or an electromagnetic damper as long as the shock damper 6 is capable of switching the damping force. The shock damper 6 is not limited to a damper that actively generates a force (damping force), namely, a semi-active damper (semi-active suspension device) that is capable of performing semi-active control. It is possible to utilize, for example, a fully-active damper (fully-active suspension device) that is capable of implementing fully-active control over a drive cylinder (hydraulic cylinder or air cylinder) or the like. The force generating mechanism may be any one of various kinds of force generating mechanisms including an air suspension device with an air spring, a kinetic suspension device capable of adjusting an efficacy of a stabilizer, an electromagnetic suspension device with an electromagnetic actuator, a hydraulic suspension device in which front, rear, right and left hydraulic cylinders are connected through pipes, and other like devices.

In any case, (the actuator of) the shock damper 6 is connected to a suspension control device 7. The damping force of the shock damper 6, which is a generated force, is adjusted, for example, by the shock damper 6 being supplied with electric power from the suspension control device 7. More specifically, current (command current) is outputted from the suspension control device 7 to the actuator of the shock damper 6, and the actuator is driven according to the current. Accordingly, the damping characteristics of the shock damper 6 are variably adjusted.

The suspension control device 7 comprises, for example, a microcomputer, a drive circuit, a power circuit, and the like. The suspension control device 7 includes a processing unit (CPU) and further includes a memory comprising, for example, a flash memory, a ROM, a RAM, an EEPROM, and other like memories, none shown. The memory stores, for example, a processing program for computing a damping force to be outputted by the shock damper 6, a processing program for calculating a torque control command that is outputted to a steering control device 16 discussed later, and other like programs.

The suspension control device 7 as a force generating mechanism control portion calculates the generated force (damping force) of the shock damper 6 on the basis of vehicle body behavior information and controls the generated force. To that end, the suspension control device 7 is connected to a vehicle height sensor 8 that detects the vehicle body behavior information. The vehicle height sensor 8 detects a vehicle height condition (height position) of the vehicle in the vicinity of the corresponding shock damper 6. The vehicle height sensor 8 is fixed at a position close to the corresponding shock damper 6 in the vehicle body 1 (that is, at the corresponding one of four corners of the vehicle).

The vehicle height sensors 8 detect the vehicle height at the four corners of the vehicle and outputs a detected signal (vehicle height information) to the suspension control device 7. The vehicle height sensor 8 forms the vehicle body behavior detecting portion (vehicle behavior detecting portion) that detects the vehicle height condition of the vehicle body 1, which is the vehicle body behavior (or more specifically, a state quantity associated with a vertical motion of the vehicle). The vehicle height sensor 8 is connected to the suspension control device 7 and thus forms, as with the suspension control device 7, a vehicle height information detecting portion that detects the vehicle height information of the vehicle (vehicle body 1).

The vehicle height information detecting portion (vehicle body behavior detecting portion) may comprise, for example, four spring acceleration sensors and four unsprung acceleration sensors, instead of the four vehicle height sensors 8 disposed close to the shock dampers 6. The vehicle height information detecting portion alternatively may comprise four spring acceleration sensors only. Further alternatively, the vehicle height information detecting portion may be a sensor that detects (the state quantity corresponding to) the vehicle height condition of the vehicle (vehicle body behavior detection sensor), instead of the vehicle height sensor 8 and the acceleration sensors. Such a sensor may be a wheel velocity sensor, not shown, which detects rotation velocities of the wheels 2 and 3, or another like sensor. In this case, for example, the vehicle height condition (vertical motion) of the vehicle may be detected by estimating the vertical motion of each of the wheels 2 and 3 from the information of one of the spring acceleration sensors (acceleration) and the information of one of the wheel velocity sensors (wheel velocity). It is also possible to utilize a sensor such as a lateral acceleration sensor that detects lateral acceleration of the vehicle and a longitudinal acceleration sensor that detects longitudinal acceleration of the vehicle, that is, a sensor of any kind which detects the state quantity of the vehicle body 1 that is the sprung side of the vehicle (vehicle body motion detection sensor). In short, a sensor of any kind which detects (the state quantity corresponding to) the vehicle body behavior including the vehicle height condition of the vehicle (vehicle body behavior detection sensor) may be utilized as the vehicle body behavior detecting portion including the vehicle height information detecting portion.

The vehicle height information detecting portion (vehicle body behavior detection sensor) may comprise, for example, an external recognition sensor, not shown. The external recognition sensor forms, for example, an object position measuring device that measures positions of objects located around the vehicle. Sensors that may be utilized as the external recognition sensor include, for example, cameras, such as stereo cameras and single cameras (for example, digital cameras) and/or radars, such as laser radars, infrared radars, and millimeter-wave radars (for example, light-emitting devices, such as semiconductor lasers, and light-receiving devices that receive the lights emitted from the light-emitting devices). The external recognition sensor is not limited to a camera or a radar and may be a sensor of any kind (detection device, measuring device, and radio-detector) which is capable of recognizing (detecting) a condition of an external environment, that is, an environment surrounding the vehicle.

According to the embodiment, the suspension control device 7 is configured to obtain the vehicle body behavior information from the vehicle height sensor 8 that is directly connected to the suspension control device 7. Instead of such constitution, the suspension control device 7 may be configured to obtain the vehicle body behavior information, for example, through a vehicle data bus 9. The vehicle data bus 9 is a communication line connecting various ECUs (Electronic Control Units) including the suspension control device 7 and the later-discussed steering control device 16.

The vehicle data bus 9 forms a CAN (Controller Area Network) as a serial communication portion installed in the vehicle body 1. The suspension control device 7 is thus allowed to use a variety of vehicle body behavior information (vehicle behavior information) including not only the vehicle height but vertical acceleration, vehicle speed, longitudinal acceleration, lateral acceleration, and the like as the vehicle body behavior information used for calculating the generated force of the shock damper 6.

A steering system 10 applies a steering angle to the right and left front wheels 2, 2 functioning as steered wheels according to the driver's steering operation. According to the embodiment, the steering system 10 is configured as an electric power steering system that uses an electric motor 13 to assist (aid) steering effort of the driver. The steering system 10 comprises a steering wheel 11, a steering shaft 12, the electric motor 13, a speed reducer 14, a torque sensor 15, and a steering control device 16 as a steering control portion.

The steering wheel 11 is also called a handle and operated by the driver. The steering shaft 12 extends in a longitudinal direction of the vehicle. The steering wheel 11 is fixed to a rear end side of the steering shaft 12. The electric motor 13 is a source generating an assist force. The electric motor 13 is rotationally driven by electric power that is supplied from the steering control device 16. The electric motor 13 imparts steering torque (assist torque) to the steering shaft 12 according to current (command current) supplied from the steering control device 16.

The speed reducer 14 comprises, for example, a worm reducer. The speed reducer 14 reduces the speed of rotation of the electric motor 13 and transmits the rotation of the electric motor 13 to the steering shaft 12. The torque sensor 15 detects the steering torque (steering wheel torque) added to the steering shaft 12 by the steering effort of the driver. In this case, the torque sensor 15 detects the steering torque, for example, from a twist amount of a torsion bar, not shown, which forms the steering shaft 12. The torque sensor 15 is connected to the steering control device 16.

The steering control device 16 comprises, for example, a microcomputer, a drive circuit, a power circuit, and the like. The steering control device 16 includes a processing unit (CPU) and further includes a memory comprising, for example, a flash memory, a ROM, a RAM, an EEPROM, and other like memories, none shown. The memory stores, for example, a processing program for computing the steering torque (assist torque) to be outputted from the electric motor 13.

The steering control device 16 controls the drive of the electric motor 13 on the basis of the steering toque detected by the torque sensor 15. On the basis of a detected value (steering torque) of the torque sensor 15, the steering control device 16 calculates a control command value corresponding to the torque (assist torque) to be imparted to the steering shaft 12. The steering control device 16 supplies current equivalent to the calculated control command value to the electric motor 13.

In the foregoing case, as described later, the torque control command is entered from the suspension control device 7 to the steering control device 16. The steering control device 16 activates the electric motor 13 with addition of the torque control command entered from the suspension control device 7. According to the embodiment, the steering system 10 can be controlled by the suspension control device 7. In this case, the suspension control device 7 is connected to the steering control device 16 of the steering system 10 through the vehicle data bus 9.

When the electric power steering system 10 is used, which uses the electric motor 13 to assist (aid) the steering effort of the driver, there is a possibility that unwanted vibration (steering vibration) is transmitted from a road surface to the steering wheel 11 through the front wheels 2, 2, the steering shaft 12, and the like. A possible idea to reduce such steering vibration is, for example, to employ the following constitutions.

A steering angle is detected by a steering angle sensor. The detected steering angle is differentiated, to thereby calculate steering velocity. To reduce the steering velocity, the steering velocity is multiplied by gain, and torque is generated from an electric motor of an electric power steering system as target torque, to thereby reduce steering angle vibration. However, the constitution described above performs FB control (feedback control) of a steering angle sensor signal and may not be able to provide compensation (may not be able to adequately reduce the steering vibration) due to a system delay. In addition, it is sometimes difficult to judge whether the behavior of the steering is resulted from the driver's operation or is vibration attributable to road surface input. For this reason, too, it is likely that the steering vibration cannot be adequately reduced. Furthermore, if the steering vibration is intended to be adequately reduced, a resistive force against the steering velocity is increased, which increases steering effort, so that there is a possibility that the reduction of the steering vibration and the steering assist cannot be achieved at the same time.

The case discussed below is a situation where the suspension devices 4 and 5 stroke due to road surface input. If the road surface input is in phase on right and left sides, no difference occurs in lateral force between the right and left wheels 2, 2 (3, 3), and there is no change in yaw motion of the vehicle. In other words, if the road surface input is equal between the right and left wheels 2, 2 (3, 3), no difference occurs in lateral force between the right and left wheels 2, 2 (3, 3), and there is no change in yaw motion of the vehicle.

While on the other hand, if the road surface input differs between the right and left sides, difference occurs in lateral force between the right and left wheels 2, 2 (3, 3), which may cause the yaw motion of the vehicle. In other words, if the road surface input differs between the right and left wheels 2, 2 (3, 3), difference occurs in lateral force between the right and left wheels 2, 2 (3, 3), which may cause the yaw motion of the vehicle. Discussed below as an example for more details is a case in which the four wheels stroke independently on the right and left sides while the vehicle travels on a rough road. In this case, the wheels 2, 2 (3, 3) change in toe angle and camber angle relative to the road surface according to the strokes, which generates the lateral forces of the wheels 2, 2 (3, 3) independently. This generates yaw moment in the vehicle and may deteriorate (decrease) straight-line vehicle stability. If the front wheels 2, 2 stroke in reverse phase on the right and left sides, for example, there is also a possibility that, the steering wheel becomes out of control (kickback from the steering wheel) due to the strokes. That is, it is likely that the straight-line vehicle stability is deteriorated due to the kickback from the steering wheel or a change in tire alignment when the vehicle travels on a rough road.

The embodiment is therefore so configured that the steering control device 16 is controlled by the suspension control device 7, which means that the suspension control device 7 controls the steering system 10 using the information of the suspension (vehicle body behavior information). In other words, the suspension control device 7 uses the information of the suspension (vehicle height information) to create a signal for reducing (mitigating) the steering vibration (vibration cancelling signal) and a signal for reducing the yaw motion of the vehicle (yaw motion reducing signal) and outputs the signals to the steering control device 16 of the steering system 10.

Specifically, the suspension control device 7 calculates the vibration generated in the steering (or more specifically, the steering wheel 11) on the basis of a detected value (vehicle height) detected by the vehicle height sensor 8. From the generated vibration that is calculated, the suspension control device 7 calculates steering torque that compensates (reduces) the generated vibration (vibration cancelling torque) and creates a signal for generating the steering torque (torque control command). The signal created by the suspension control device 7, namely, a "signal for generating steering torque that compensates or cancels the vibration generated in a steering," is outputted from the suspension control device 7 to the steering control device 16. This makes it possible to repress the steering vibration. In the above-described manner, the embodiment calculates the steering vibration attributable to the road surface input from the vehicle height information (vehicle height, relative velocity, and other information) that is information of suspension stroke and then generates the steering torque that compensates the vibration through FF control (feed-forward control). This makes it possible to reduce the steering vibration. The term "compensate" here means to completely cancel vibrations and also to reduce or mitigate steering vibrations.

The suspension control device 7 calculates the lateral force generated by a geometry change of the suspension devices 4 and 5 on the basis of the detected value (vehicle height) of the vehicle height sensor 8. From the lateral force that is calculated, the suspension control device 7 calculates (estimates or predicts) the yaw motion of the vehicle based on the difference between the lateral forces generated in the right and left wheels 2, 2 (3, 3). The suspension control device 7 then calculates steering torque for repressing the yaw motion of the vehicle (unwanted motion repressing torque) from the yaw motion of the vehicle that is calculated (estimated or predicted) and creates a signal for generating the steering torque (torque control command). The signal created by the suspension control device 7, namely, a "signal for generating steering torque that represses the yaw motion of the vehicle based on difference between the lateral forces of the right and left wheel 2, 2 (3, 3)," is outputted from the suspension control device 7 to the steering control device 16. This makes it possible to repress a yaw change in the vehicle, which is generated attributable to the road surface input.

In other words, the lateral force change that occurs due to the geometry change is calculated from the information of the suspension stroke and of the steering angle, and the steering torque is generated on the basis of the value calculated, to thereby repress the yaw change that occurs due to the road surface input. This improves the straight-line vehicle stability during the travel on a rough road and reduces the loss of control over the steering wheel (kickback from the steering wheel). The embodiment, as described above, calculates the yaw motion of the vehicle attributable to the road surface input from the vehicle height information (vehicle height, relative velocity, and other information) that is the information of the suspension stroke and generates the steering torque that represses the yaw motion through the FF control (feed-forward control). This reduces the yaw motion of the vehicle and the kickback from the steering wheel.

Figure 2:
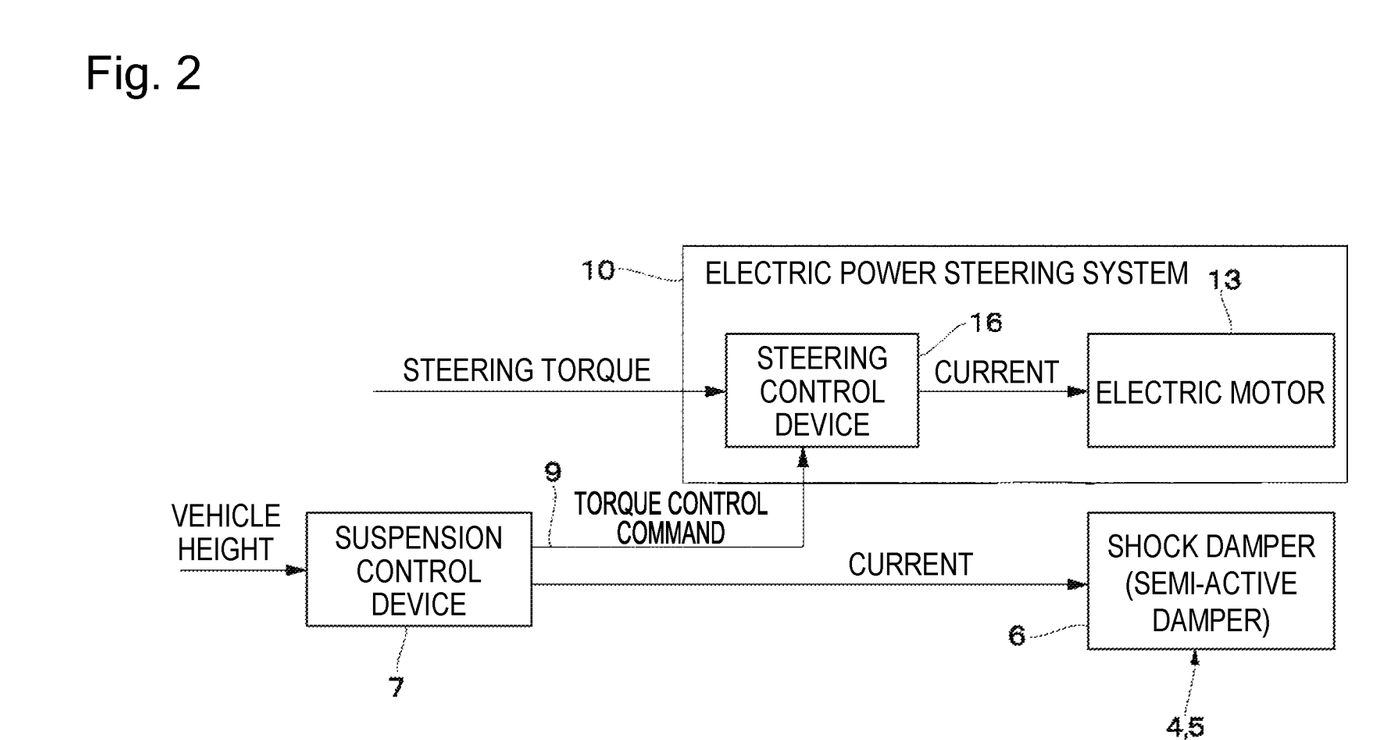

FIG. 2 shows the suspension control device 7 together with the steering control device 16 and the like. As illustrated in FIG. 2, the suspension control device 7 calculates a torque control command (that is, a steering torque command corresponding to the vibration cancelling torque and the unwanted motion repressing torque) on the basis of the obtained vehicle height information and then outputs the calculated torque control command to the steering control device 16. The steering control device 16 calculates a control command value (that is, a steering torque command value corresponding to assist torque to be imparted to the steering shaft 12) on the basis of the steering torque detected by the torque sensor 15. The steering control device 16 adds a "calculated control command value" and a "torque control command issued from the suspension control device 7" and thus calculates a torque final command value corresponding to steering torque (final steering torque) to be finally outputted from the electric motor 13. The steering control device 16 outputs current to the electric motor 13 on the basis of the torque final command value that is calculated, to thereby control the steering system 10.

Figure 3:
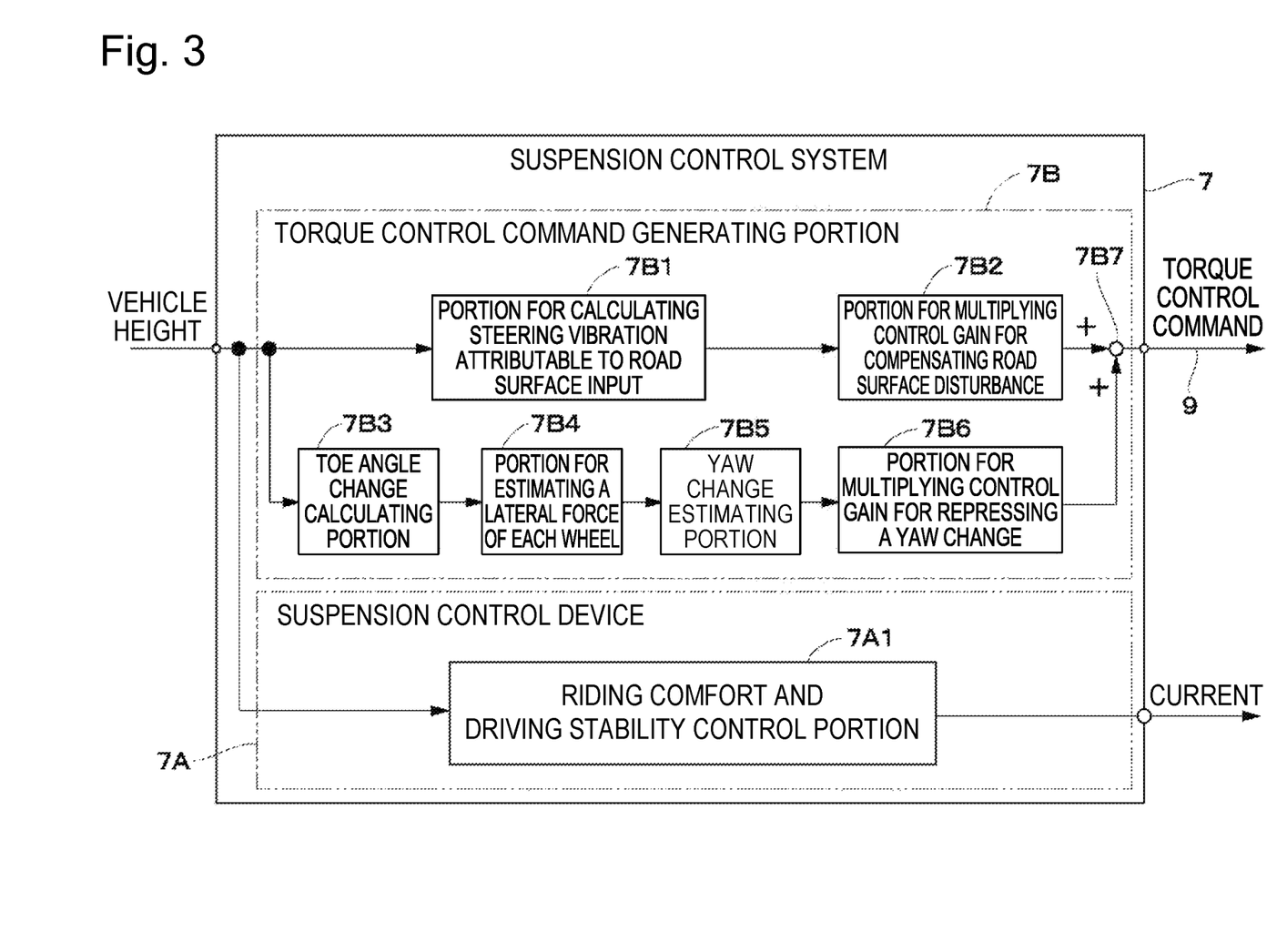
FIG. 3 is a block diagram showing the suspension control device of FIG. 2.

FIG. 3 shows the suspension control device 7. As illustrated in FIG. 3, the suspension control device 7 includes a suspension control portion 7A and a torque control command generating portion 7B. The suspension control portion 7A controls current that is supplied to the actuator of the shock damper 6. The suspension control portion 7A comprises a riding comfort and driving stability control portion 7A1. The riding comfort and driving stability control portion 7A1 has an input side that is connected to the vehicle height sensor 8. An output side of the riding comfort and driving stability control portion 7A1 is connected to the actuator of the shock damper 6. The vehicle height information is entered from the vehicle height sensor 8 to the riding comfort and driving stability control portion 7A1. The riding comfort and driving stability control portion 7A1 calculates a vehicle body behavior (vehicle behavior) using the vehicle height information.

To improve riding comfort and driving stability, the riding comfort and driving stability control portion 7A1, for example, computes a target damping force using a skyhook control law and calculates a target current value so as to generate the target damping force. The riding comfort and driving stability control portion 7A1 outputs current corresponding to the calculated target current value (command current) to the actuator of the shock damper 6. A control law used for calculating the target damping force is not limited to the skyhook control, and feedback control, such as optimum control, H∞ control and the like may be used. Although the embodiment uses the target damping force as a control command, a target damping coefficient may be used instead.

The torque control command generating portion 7B calculates, on the basis of the vehicle height information, the torque control command outputted to the steering control device 16. The torque control command generating portion 7B then outputs the calculated torque control command to the steering control device 16. The torque control command is a command (signal) for generating a "steering torque for reducing steering vibration" and a "steering torque for repressing the yaw motion of the vehicle" from the electric motor 13 of the steering system 10.

The torque control command generating portion 7B forms a steering torque generating portion (vibration reducing torque generating portion) that calculates the vibration generated in the steering on the basis of the detected value (vehicle height) detected by the vehicle height sensor 8 and creates a signal for generating steering torque for compensating the generated vibration. The torque control command generating portion 7B therefore includes a portion 7B1 for calculating steering vibration attributable to road surface input and a portion 7B2 for multiplying control gain for compensating a road surface disturbance.

In addition, the torque control command generating portion 7B forms a steering torque generating portion (unwanted motion repressing torque generating portion) that calculates the lateral force generated by the geometry change in the suspension devices 4 and 5 on the basis of the detected value (vehicle height) detected by the vehicle height sensor 8 and creates a signal for generating the steering torque that represses the yaw motion of the vehicle based on the calculated lateral force. The torque control command generating portion 7B therefore includes a toe angle change calculating portion 7B3, a portion 7B4 for estimating a lateral force of each wheel, a yaw change estimating portion 7B5 and a portion 7B6 for multiplying control gain for repressing a yaw change. The torque control command generating portion 7B further includes an adding portion 7B7.

The portion 7B1 for calculating steering vibration attributable to road surface input calculates the steering vibration attributable to the road surface input. The steering vibration attributable to the road surface input is generated according to vehicle height difference between the right and left front wheels 2, 2 (right-left difference). The portion 7B1 for calculating steering vibration attributable to road surface input calculates the right-left vehicle height difference (vehicle height difference between the right and left front wheels 2, 2) from the vehicle height information obtained from the vehicle height sensor 8 and then differentiates the right-left vehicle height difference, to thereby calculate relative velocity difference. The relative velocity difference calculated by the portion 7B1 for calculating steering vibration attributable to road surface input is outputted to the portion 7B2 for multiplying control gain for compensating a road surface disturbance.

The portion 7B2 for multiplying control gain for compensating a road surface disturbance multiplies the relative velocity difference by a road surface compensation control gain, to thereby calculate a road surface disturbance compensation control command. The road surface compensation control gain is, for example, previously obtained through calculation, an experiment, simulation or another like method so that the road surface disturbance compensation control command compensates (cancels) the steering vibration. The portion 7B2 for multiplying control gain for compensating a road surface disturbance outputs the road surface disturbance compensation control command that is calculated (that is, the steering torque command corresponding to the vibration cancelling torque) to the adding portion 7B7.

The following description explains control for repressing a yaw change in the vehicle, which is attributable to the road surface input. The yaw change in the vehicle, which is attributable to the road surface input is generated as follows: The wheels 2 and 3 are changed in toe angle due to a vehicle height change caused by the road surface input (a change in stroke of the suspension devices 4 and 5). On the basis of the change in toe angle, a tire sideslip angle is generated in the wheels 2 and 3, and a tire lateral force is then generated in the wheels 2 and 3. With respect to this lateral force, if the right and left wheels stroke in phase in the same manner, the right and left wheels are equal in toe angle change relative to the strokes, and the lateral forces are mutually cancelled by the right and left wheels. The yaw change therefore does not occur. However, if the right and left wheels stroke in a different manner, and the toe angles on the right and left sides are in reverse phase, the right and left lateral forces are generated in the same direction. This causes a yaw change and incurs the loss of control over the steering wheel (kickback from the steering wheel). If a change in camber angle of the tires relative to the ground, which is generated at this time, differs between the right and left tires, the lateral force is generated, and the yaw change also occurs in the vehicle.

The toe angle change calculating portion 7B3 calculates a toe angle change on the basis of the suspension geometry information from the information of the vehicle height on the right and left sides, which is obtained by the vehicle height sensor 8. The toe angle change calculated by the toe angle change calculating portion 7B3 is outputted to the portion 7B4 for estimating a lateral force of each wheel. Assuming that the sideslip angle of the vehicle, which is generated when the toe angle is changed, is zero, the toe angle change becomes equivalent to the tire sideslip angle. The portion 7B4 for estimating a lateral force of each wheel therefore calculates the lateral force based on the toe angle change. The camber angle is calculated by adding a roll angle and the suspension camber angle change. The portion 7B4 for estimating a lateral force of each wheel calculates camber thrust of each wheel. The portion 7B4 for estimating a lateral force of each wheel outputs the lateral force of each wheel, which is thus calculated, to a yaw change estimating portion 7B5. The yaw change estimating portion 7B5 sums the lateral forces of the wheels, which are calculated by the portion 7B4 for estimating a lateral force of each wheel. The yaw change estimating portion 7B5 then calculates yaw moment around a gravity point from the summed lateral force. The yaw moment calculated by the yaw change estimating portion 7B5 is outputted by a portion 7B6 for multiplying control gain for repressing a yaw change.

The portion 7B6 for multiplying control gain for repressing a yaw change multiplies the yaw moment by control gain for repressing a yaw change, to thereby calculate a yaw change repressing control command proportional to the yaw moment calculated by the yaw change estimating portion 7B5. The control gain for repressing a yaw change is, for example, previously obtained through calculation, an experiment, simulation or another like method so that the yaw change repressing control command becomes a command that represses the yaw change in the vehicle. The portion 7B6 for multiplying control gain for repressing a yaw change outputs to the adding portion 7B7 the yaw change repressing control command (that is, the steering torque command corresponding to the unwanted motion repressing torque) that is calculated.

The road surface disturbance compensation control command and the yaw change repressing control command are entered to the adding portion 7B7. The adding portion 7B7 sums the road surface disturbance compensation control command and the yaw change repressing control command and thus calculates the torque control command to be outputted to the steering control device 16. The adding portion 7B7 outputs the calculated torque control command to the steering control device 16.

The vehicle control system according to the embodiment is configured as described above. The following description explains control processing of the shock damper 6 using the suspension control device 7 and control processing of the steering system 10.

A detected signal corresponding to the vehicle height is entered to the suspension control device 7 from the vehicle height sensors 8 disposed correspondingly to the respective suspension devices 4 and 5. At the same time, the suspension control portion 7A (riding comfort and driving stability control portion 7A1) of the suspension control device 7 computes a target damping force using the skyhook control law or the like from the vehicle height information and then calculates target current required to generate the target damping force. The suspension control device 7 outputs current corresponding to the calculated target current to the actuator of the shock damper 6. The damping force characteristics of the shock damper 6 then become variable between the hard characteristics (thick characteristics) and the soft characteristics (thin characteristics) and are controlled in a continuous manner.

The torque control command generating portion 7B of the suspension control device 7 calculates the torque control command to be outputted to the steering control device 16 of the steering system 10 from the vehicle height information. To be specific, the road surface disturbance compensation control command is calculated by the portion 7B1 for calculating steering vibration attributable to road surface input and the portion 7B2 for multiplying control gain for compensating a road surface disturbance. At the same time, the yaw change repressing control command is calculated by the toe angle change calculating portion 7B3, the portion 7B4 for estimating a lateral force of each wheel, the yaw change estimating portion 7B5, and the portion 7B6 for multiplying control gain for repressing a yaw change. The road surface disturbance compensation control command that is calculated and the yaw change repressing control command are added together by the adding portion 7B7, to thereby calculate the torque control command to be outputted to the steering control device 16. The suspension control device 7 outputs the calculated torque control command to the steering control device 16. The steering control device 16 thus can impart the steering torque according to the torque control command issued from the suspension control device 7 (that is, the vibration cancelling torque and the unwanted motion repressing torque) from the electric motor 13 of the steering system 10 to the steering shaft 12.

According to the embodiment, as described above, the torque control command generating portion 7B of the suspension control device 7 calculates the vibration generated in the steering on the basis of the vehicle height information of the vehicle. In other words, unwanted steering vibration attributable to the road surface input is generated according to the right-left difference between the right and left wheels (vehicle height difference in the right and left front wheels 2, 2), and the torque control command generating portion 7B calculates the vibration generated in the steering on the basis of the vehicle height information of the vehicle. From the generated vibration that is calculated, the torque control command generating portion 7B creates a signal for generating the steering torque that compensates the generated vibration, that is, the road surface disturbance compensation control command.

Therefore, if the created signal is outputted to the electric power steering system 10 configured to assist the steering effort of the driver through the electric motor 13, this makes it possible to output "steering torque added with steering torque for compensating the generated vibration" from the electric motor 13 of the electric power steering system 10. In other words, the electric motor 13 of the electric power steering system 10 can output "steering torque for cancelling the generated vibration attributable to the road surface input" and "steering torque for assisting the driver's steering operation." This makes it possible to repress the steering vibration.

According to the embodiment, the torque control command generating portion 7B of the suspension control device 7 calculates the yaw moment (yaw change) of the vehicle on the basis of the vehicle height information of the vehicle. The unwanted yaw motion of the vehicle attributable to the road surface input is generated according to the geometry change of the suspension devices 4 and 5 based on the road surface input, so that the torque control command generating portion 7B calculates the yaw moment (yaw change) on the basis of the vehicle height information of the vehicle. From the calculated yaw moment (yaw change), the torque control command generating portion 7B creates a signal for generating the steering torque for repressing the yaw moment (yaw change), that is, the yaw change repressing control command.

Therefore, if the created signal is outputted to the electric power steering system 10 configured to assist the steering effort of the driver through the electric motor 13, this makes it possible to output "steering torque added with the steering torque for repressing a yaw change in the vehicle" from the electric motor 13 of the electric power steering system 10. In other words, the electric motor 13 of the electric power steering system 10 can output "steering torque for cancelling a yaw change in the vehicle, attributable to the road surface input" and "steering torque for assisting the driver's steering operation." The yaw motion of the vehicle is therefore repressed, which improves the straight-line vehicle stability during the travel on the rough road and represses the loss of control over the steering wheel (kickback from the steering wheel). When the vehicle travels on a high-frequency road surface that is difficult for the force generating mechanism to respond, vibration is reduced by the steering torque generated by the electric power steering system 10.

The embodiment has been discussed, taking as an example the case in which the vehicle height information detecting portion configured to detect the vehicle height information of the vehicle comprises the vehicle height sensor 8. Instead of the vehicle height sensor 8, the vehicle height information detecting portion may comprise an external recognition sensor, such as a camera, a radar or another like sensor. In such a case, the external recognition sensor detects vertical changes, ruts, and irregularities on the road ahead of the vehicle. This makes it possible to detect a change in vehicle height of the vehicle before the change occurs. In other words, the vibration generated in the steering can be calculated (predicted) before the vibration is generated, which makes it possible to repress the steering vibration at a higher level.

The embodiment has been discussed, taking as an example the case in which the suspension control device 7 is used to calculate the torque control command (the signal for generating steering torque that reduces steering vibration and the signal for generating steering torque that reduces the yaw motion of the vehicle) from the vehicle height information. Instead of calculating the torque control command using the suspension control device, for example, it is also possible to enter the vehicle height information to the steering control device of the steering system, and calculate the torque control command from the vehicle height information by the steering control device. The suspension control device and the steering control device may be integrally configured.

The embodiment has been discussed, taking as an example the case in which the suspension control device 7 and the steering control device 16 are connected together through the vehicle data bus 9 that further connects the suspension control device 7 and the steering control device 16 to the other ECUs. It is also possible, for example, to connect a suspension control device and a steering control device together through a dedicated communication line, instead of the vehicle data bus 9.

The embodiment has been discussed, taking as an example the case in which the torque control command generating portion 7B of the suspension control device 7 calculates (generates) both the road surface disturbance compensation control command for compensating the steering vibration and the yaw change repressing control command for repressing the yaw change in the vehicle. Instead of the foregoing constitution, for example, the suspension control device may be configured to calculate (generate) either one of the commands, that is, may be configured to calculate (generate) the road surface disturbance compensation control command or calculate (generate) the yaw change repressing control command.

The embodiment has been discussed, taking as an example of the steering system 10, the electric power steering system 10 configured to assist (aid) the steering effort of the driver through the electric motor 13. In other words, the embodiment has been discussed, taking as an example the case in which the electric power steering system 10 configured to aid the steering effort is controlled by the suspension control device 7. Instead of the foregoing constitution, for example, it is also possible to control a steering system of a steer-by-wire vehicle using a suspension control device.

According to steer-by-wire steering, even if there is road surface input, the driver may have a feeling of strangeness without FB information (feedback information) relative to the steering. Comparatively speaking, steer-by-wire technology allows a suspension control device to be configured as described below. The suspension control device calculates a steering reaction force to be provided to the driver on the basis of a detected value of a vehicle height information detecting portion. The suspension control device calculates steering torque (road surface reaction force torque) corresponding to the calculated steering reaction force and creates a signal for generating the steering torque.

The above-described constitution represses the feeling of strangeness caused by absence of feedback (feedback from the steering wheel) of the road surface input relative to the steering during a travel on a rough road. According to the steer-by-wire technology, it is possible to employ such constitution that steering characteristics (road surface reaction force characteristics) are changeable, or more specifically, for example, that a steering mode can be switched from a normal mode to another mode, such as a sport mode. In other words, it is possible to employ such constitution that a plurality of switchable steering modes are provided and that the steering characteristics (steering reaction force) can be changed according to the switched steering mode. In this case, for example, when the sport mode is selected, dynamic steering feel can be obtained by increasing the feedback of the road surface input.

The embodiment has been discussed, taking as an example the case in which the force generating mechanism is the shock damper 6, that is, in which the force generating mechanism is a hydraulic semi-active damper. The force generating mechanism, however, is not limited to the hydraulic semi-active damper and may be a semi-active damper of another type, such as an ER damper (electrorheological fluid damper). The force generating mechanism may be selected from a variety of force generating mechanisms including, for example, a hydraulic actuator of a fully-active damper, an air spring of an air suspension device, an actuator that adjusts a stabilizer and an efficacy of the stabilizer, a linear motor that forms an electromagnetic suspension, and the like. The embodiment provides the electric power steering system as an example of a power steering system. Instead of the electric power steering system, the power steering system may be a hydraulic power steering system. In this case, torque is generated by a hydraulic pump.

Vehicle control systems based on the above-discussed embodiment include, for example, vehicle control systems according to the following modes.

According to a first mode, a vehicle control system comprises a force generating mechanism disposed between a vehicle body side and a wheel side in a vehicle and capable of adjusting a generated force, and a force generating mechanism control portion configured to calculate the generated force of the force generating mechanism on the basis of vehicle body behavior information and control the generated force. The force generating mechanism control portion includes a vehicle height information detecting portion configured to detect vehicle height information of the vehicle and a steering torque generating portion configured to calculate vibration generated in a steering on the basis of a detected value of the vehicle height information detecting portion and generate steering torque for reducing the generated vibration.

According to the first mode, the steering torque generating portion of the force generating mechanism control portion calculates the vibration generated in the steering on the basis of the vehicle height information of the vehicle. The steering vibration attributable to road surface input is generated according to right-left difference between right and left wheels (vehicle height difference between the right and left sides), so that the steering torque generating portion calculates the vibration generated in the steering on the basis of the vehicle height information of the vehicle. From the generated vibration that is calculated, the steering torque generating portion generates steering torque for reducing the generated vibration. For example, the steering torque generating portion creates a signal for generating steering torque that reduces the generated vibration.

For example, if the created signal is outputted to an electric power steering system configured to assist the steering effort of the driver through an electric motor, "steering torque added with steering torque for reducing the generated vibration" can be outputted from the electric motor of the electric power steering system. In other words, the electric motor of the electric power steering system is capable of outputting "steering torque for cancelling the generated vibration attributable to the road surface input" and "steering toque for assisting a steering operation by the driver." This makes it possible to repress the steering vibration.

In a second mode according to the first mode, the vehicle height information detecting portion is an external recognition sensor.

According to the second mode, the external recognition sensor detects vertical changes, ruts, and irregularities on the road ahead of the vehicle. This makes it possible to detect a change in vehicle height of the vehicle before the change occurs. In other words, the vibration generated in the steering can be calculated (predicted) before the vibration is generated, which makes it possible to repress the steering vibration at a higher level.

In a third mode according to the first or second mode, the steering torque generating portion uses the vehicle height information detected by the vehicle height information detecting portion to create a signal for reducing the vibration generated in the steering and a signal for reducing a yaw motion of the vehicle, to thereby generate steering torque for controlling the steering.

In a fourth mode according to any one of the first to third modes, the steering is a power steering system that is electrically or hydraulically power-assisted. Steering torque that is generated by the power steering system cancels the yaw motion attributable to road surface input and generates a force for assisting a steering operation by the driver.

In a fifth mode according to the third mode, the steering torque generating portion calculates a lateral force generated by a geometry change of the force generating mechanism on the basis of the vehicle height information detected by the vehicle height information detecting portion. The steering torque generating portion then calculates or predicts the yaw motion of the vehicle from the calculated lateral force.

In a sixth mode according to the first or second mode, the steering is a power steering system that is electrically or hydraulically power-assisted. The power steering system includes a steering control portion configured to control steering torque. The steering control portion includes the steering torque generating portion instead of the force generating mechanism control portion. The steering torque generating portion of the steering control portion uses the vehicle height information detected by the vehicle height information detecting portion to create a signal for reducing the vibration generated in the steering and a signal for reducing a yaw motion of the vehicle, to thereby generate steering torque for controlling the steering.

In a seventh mode according to any one of the first to sixth modes, the steering comprises a steer-by-wire system. The steering torque generating portion generates a steering reaction force to be provided to the driver on the basis of a detected value of the vehicle height information detecting portion.

In an eighth mode according to the seventh mode, the steering reaction force is switched by changing a plurality of steering modes.

The invention is not limited to the embodiments which have been described and may be modified in various ways. For example, the embodiments are intended to explain the invention to facilitate the understanding of the invention and do not necessarily have to include all the constitutions mentioned above. A part of the constitution of any one of the embodiments may be replaced with the constitution of another embodiment. The constitution of any one of the embodiments may be incorporated into the constitution of another embodiment. It is also possible to incorporate or replace a part of the constitution of any one of the embodiments into or with the constitution of another embodiment, or eliminate a part of the constitution of any one of the embodiments.

The present patent application claims priority under Japanese Patent Application No. 2017-186960 filed on Sep. 27, 2017. The entire disclosure of Japanese Patent Application No. 2017-186960 filed on Sep. 27, 2017 including the description, claims, drawings and abstract, is incorporated herein by reference in its entirety.

REFERENCE SIGN LIST

1: Vehicle body (vehicle)
2: Front wheel (wheel, vehicle)
3: Rear wheel (wheel, vehicle)
4: Front-wheel suspension device
5: Rear-wheel suspension device
6: Shock damper (force generating mechanism)
7: Suspension control device (force generating mechanism control device, vehicle height information detecting portion)
7B: Torque control command generating portion (steering torque generating portion)
8: Vehicle height sensor (vehicle height information detecting portion
10: Steering system (steering, power steering system)
16: Steering control device (steering control portion)

The invention claimed is:

1. A vehicle control system comprising:
a steering device including a steering torque applying portion that is capable of generating torque by operating a steering;
a first vehicle height information detecting portion which includes a first sensor configured to detect a first vehicle height at a left side of a vehicle body of a vehicle, wherein the first vehicle height is a state quantity associated with a vertical motion of the vehicle, the first sensor being disposed at a first suspension device of a left side wheel of the vehicle; and
a second vehicle height information detecting portion which includes a second sensor configured to detect a second vehicle height at a right side of the vehicle body, wherein the second vehicle height is a state quantity associated with the vertical motion of the vehicle, the second sensor being disposed at a second suspension device of a right side wheel of the vehicle,
wherein the vehicle control system is configured to obtain torque that is generated by the steering torque applying portion and to output the torque to the steering device by feed-forward control based on a difference between the first vehicle height and the second vehicle height respectively detected by the first and second sensors of the first and second vehicle height information detecting portions.

2. The vehicle control system according to claim 1, wherein the first and second vehicle height information detecting portions are external recognition sensors.

3. The vehicle control system according to claim 1,
further comprising a steering torque generating portion configured to calculate vibration generated in a steering based on the difference between the first vehicle height and the second vehicle height respectively detected by the first and second sensors of the first and second vehicle height information detecting portions and generate steering torque for reducing the generated vibration,
wherein the steering torque generating portion uses the first vehicle height and the second vehicle height respectively detected by the first and second sensors of the first and second vehicle height information detecting portions to create a signal for reducing the vibration generated in the steering and a signal for reducing a yaw motion of the vehicle, and generates steering torque for controlling the steering.

4. The vehicle control system according to claim 1,
wherein the steering device is a power steering system that is electrically or hydraulically power-assisted, and
wherein steering torque that is generated by the power steering system cancels yaw motion attributable to road surface input and generates a force for assisting a steering operation by a driver.

5. The vehicle control system according to claim 1,
wherein the steering device comprises a steer-by-wire system, and
the steering device is configured to generate a steering reaction force to be provided to the driver by the feed-forward control based on the difference between the first vehicle height and the second vehicle height respectively detected by the first and second sensors of the first and second vehicle height information detecting portions.

6. The vehicle control system according to claim 3, wherein the steering torque generating portion calculates a lateral force generated by a geometry change of the vehicle due to a height change between the vehicle and the left and right side wheels on a basis of the first vehicle height and the second vehicle height respectively detected by the first and second sensors of the first and second vehicle height information detecting portions, and calculates or predicts the yaw motion of the vehicle from the calculated lateral force.

7. The vehicle control system according to claim 5, wherein the steering reaction force can be switched by changing a plurality of steering modes.

\* \* \* \* \*